(12) United States Patent
Qilian

(10) Patent No.: US 7,024,790 B1
(45) Date of Patent: Apr. 11, 2006

(54) DOUBLE-AXIS BELT-DRIVEN TAPE MEASURE

(75) Inventor: Wu Qilian, Zhejiang (CN)

(73) Assignee: Ningbo JL Measuring & Tools,Co., Ltd., Zehjiang (CN)

( * ) Notice: Subject to any disclaimer, the term of this patent is extended or adjusted under 35 U.S.C. 154(b) by 0 days.

(21) Appl. No.: 10/710,002

(22) Filed: Jun. 11, 2004

(51) Int. Cl.
*G01B 3/10* (2006.01)

(52) U.S. Cl. .................. 33/755; 33/761; 242/375.3

(58) Field of Classification Search ............ 33/732, 33/750, 753, 754, 755, 756, 760, 761, 764, 33/768, 769, 770; 242/375, 375.3
See application file for complete search history.

(56) References Cited

U.S. PATENT DOCUMENTS

| | | | | |
|---|---|---|---|---|
| 2,668,036 A | * | 2/1954 | Klemm | 242/157 R |
| 2,673,694 A | * | 3/1954 | Howell | 242/373 |
| 4,189,107 A | * | 2/1980 | Quenot et al. | 242/390.1 |
| 4,506,446 A | * | 3/1985 | Mitchell | 33/762 |
| 4,551,847 A | * | 11/1985 | Caldwell | 377/24 |
| 4,569,490 A | * | 2/1986 | Church | 242/375.3 |
| 5,042,159 A | * | 8/1991 | Millen | 33/414 |
| 5,119,521 A | | 6/1992 | Clontz | |
| 5,471,761 A | * | 12/1995 | Cheng | 33/761 |
| 5,575,077 A | | 11/1996 | Jung Tae | |
| 5,820,057 A | * | 10/1998 | Decarolis et al. | 242/375.3 |
| 5,875,987 A | * | 3/1999 | Pullen | 242/379 |
| 5,920,997 A | * | 7/1999 | Girtman | 33/414 |
| 6,032,896 A | * | 3/2000 | Liu | 242/381.6 |
| 6,115,933 A | * | 9/2000 | Li | 33/767 |
| 6,167,635 B1 | * | 1/2001 | Lin | 33/767 |
| 6,182,916 B1 | * | 2/2001 | Lin | 242/379 |
| 6,349,482 B1 | * | 2/2002 | Gilliam | 33/767 |
| 6,643,948 B1 | * | 11/2003 | Seymour | 33/767 |
| 6,715,214 B1 | * | 4/2004 | Lin | 33/755 |
| 6,826,845 B1 | * | 12/2004 | Pritchard | 33/414 |
| 2004/0064961 A1 | | 4/2004 | Harris et al. | |

* cited by examiner

*Primary Examiner*—Diego Gutierrez
*Assistant Examiner*—Amy R. Cohen
(74) *Attorney, Agent, or Firm*—James C. Nemmers

(57) ABSTRACT

A measuring tape having a housing for receiving a spring-powered double-axis reel assembly. The reel assembly includes a primary spool having a length of measuring tape wound around it, and a secondary spool having a spring. The primary and secondary spools are connected by an endless flexible member.

9 Claims, 2 Drawing Sheets

DOUBLE-AXIS BELT-DRIVEN TAPE MEASURE

BACKGROUND OF INVENTION

This invention relates to a measuring tool, and more particularly to a measuring tape with two principal axes which are connected by an endless flexible member.

Construction workers, carpenters and person who enjoy doing tasks themselves typically use hand-held tape measures to measure lumber, distances between points, and a variety of other uses. Conventional tape measures comprise a metal or plastic housing with an elongated strip of a flexible material, called a tape blade, wound around a spring-loaded shaft within the housing. The tape blade is marked with suitable units of measurement, and typically must be capable of measuring at least twenty (20) feet in order to meet the needs of most users.

In use, the free end of the tape is pulled far enough from the housing to expose enough of the tape blade to perform the desired measurement. When released, the spring-loaded shaft retracts the blade into the housing. Conventional measuring tapes are designed with the spring and the measuring tape blade wound on the same axis. The single axis design causes conventional tape measures to be awkward and difficult to handle because of their large, square configuration. A conventional twenty (20) foot square-shaped tape measure is too large for most workmen to hold comfortably in one hand. Smaller conventional tape measures are relatively easy to hold with one hand, however, they do not contain a sufficient length of the measuring tape blade to be practical.

U.S. patent application Publication Ser. No. 10/264,293 discloses an oblong tape measure aimed at improving the ergonomics of conventional square-shaped tape measures. The device disclosed in this publication has three separate axes. The first axis comprises the measuring tape on a spool with a gear, the secondary axis comprises a spring on a spool with a gear, and the third axis comprises a gear which combines the gears of the other two axes. The problem with this device is that the three gear design is difficult to properly align, it is expensive, and it is prone to mechanical failure because of misalignment or breakage of the gears.

Therefore, there is a need for a measuring tape that fits comfortably into the user's hands, is capable of measuring distances of at least twenty (20) feet, and is not prone to mechanical failure.

It is therefore an object of the invention to provide a measuring tape with a self powered reel assembly, wherein the reel assembly comprises two principal axes that are connected by an endless flexible member.

It is further an object of the invention to provide a measuring tape that is an oblong shape so that it comfortably fits in the user's hand.

It is further an object of the invention to provide a measuring tape with a triple break design which allows the user to employ whichever break is most ergonomically suited for his/her hand.

SUMMARY OF INVENTION

This present invention is a tape measure having a self-powered reel assembly. The reel assembly comprises two principal axes with a spool and a gear on each axis. The spool on the first axis is a take-up spool for storing the measuring tape blade when it is not being used in its extended position. The spool on the second axis has a spring. The gear of the primary axis and the gear of the secondary axis are connected by an endless flexible member. When the tape blade on the primary spool is pulled out of the housing by force, the spring on the secondary spool is synchronously contracted because of its connection to the primary spool through the endless flexible member. When the external force on the tape blade disappears, the previously contracted spring will produce a restoring force, which enables the extended measuring tape blade to recoil automatically. The double axis design of the present invention provides an elongated ergonomically correct housing while allowing the measuring tape blade to be long enough to accomplish most jobs. The present invention provides convenience and comfort in operation, stability in recoiling, and low chances of mechanical failure.

The tape measure device of the present invention has three independent actuating means for selectively clamping the tape blade in the extended position. The first actuating means is the tape blade lock, which has a locking means that is movable from a first position to a second position. In the second position, the blade lock clamps the tape blade so that it cannot be retracted by the spring.

The second actuating means is the side point break, which has a button on the side of the tape measure housing. The button is depressed to actuate a means for applying pressure to the tape blade which holds the blade in the extended position. When pressure is removed from the button, the tape blade recoils into the housing. The third means is the bottom point break, which is similar in function to the side point break, however, it is located on the bottom of the tape measure housing instead of on the side.

DETAILED DESCRIPTION

Figure 2:
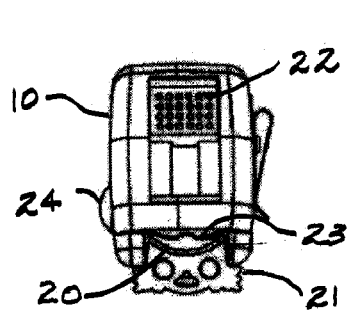
FIG. 2 is an end elevational view of the tape measure viewing FIG. 1 from the right.
Figure 1:
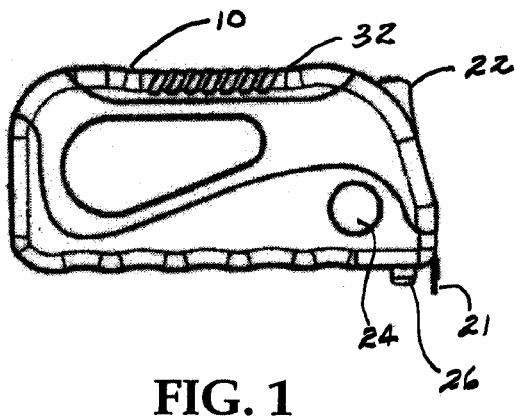
FIG. 1 is a side elevational view of the first side of the tape measure of the present invention.
Figure 3:
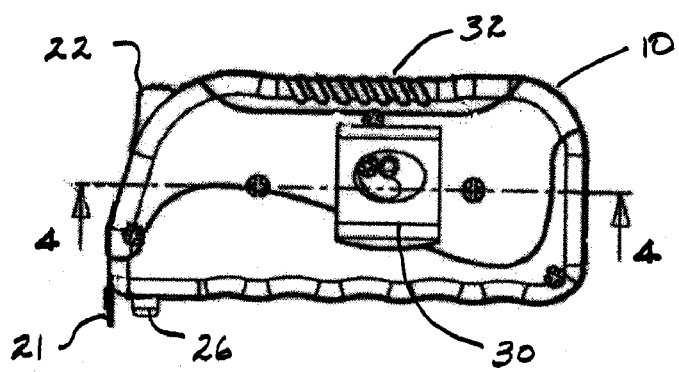
FIG. 3 is a side elevational view of the second side of the tape measure of the present invention.
Figure 4:
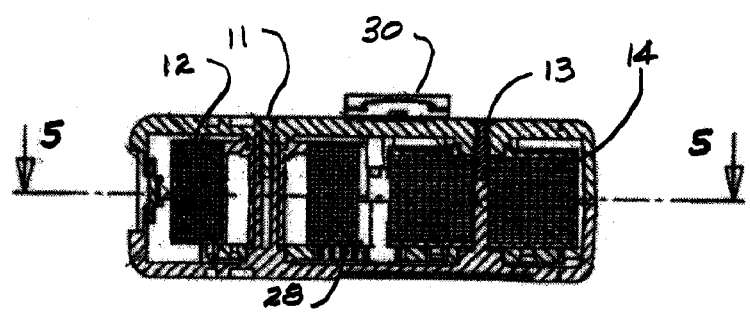
FIG. 4 is a sectional view taken on the line 4—4 of FIG. 3.
Figure 5:
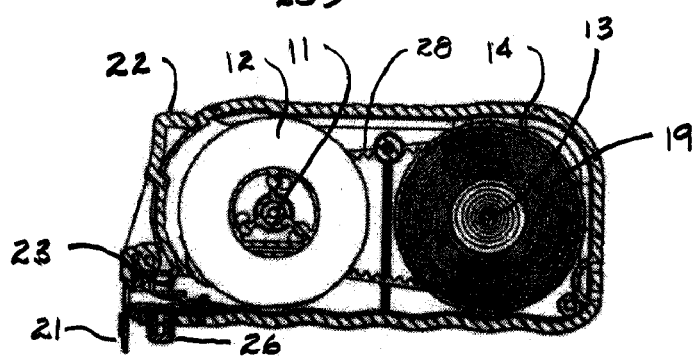
FIG. 5 is a sectional view taken on the ling 5—5 of FIG. 4.
Figure 6:
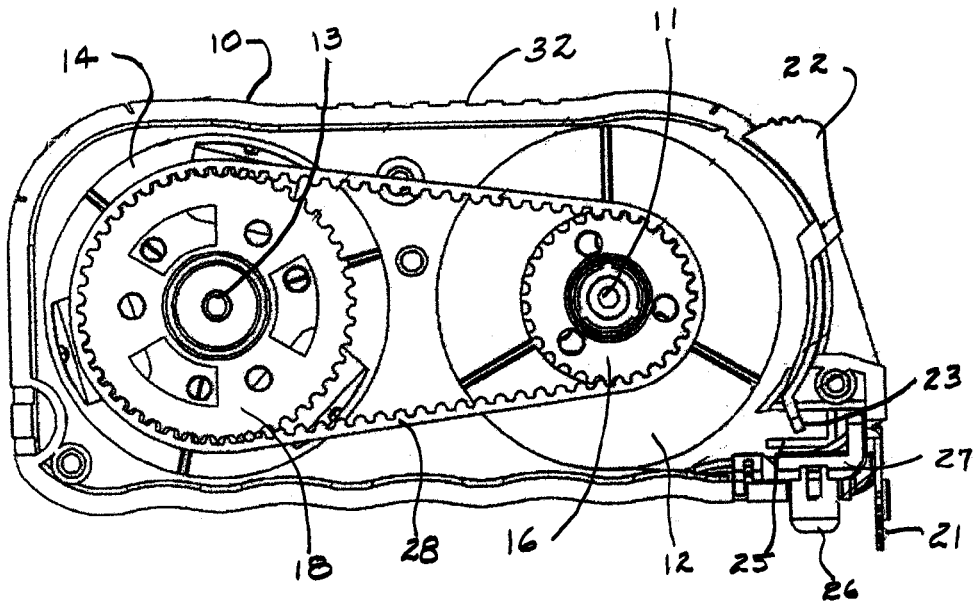
FIG. 6 is a side elevational view of the first side of the tape measure in which the housing has been removed to show the internal structure.
Figure 7:
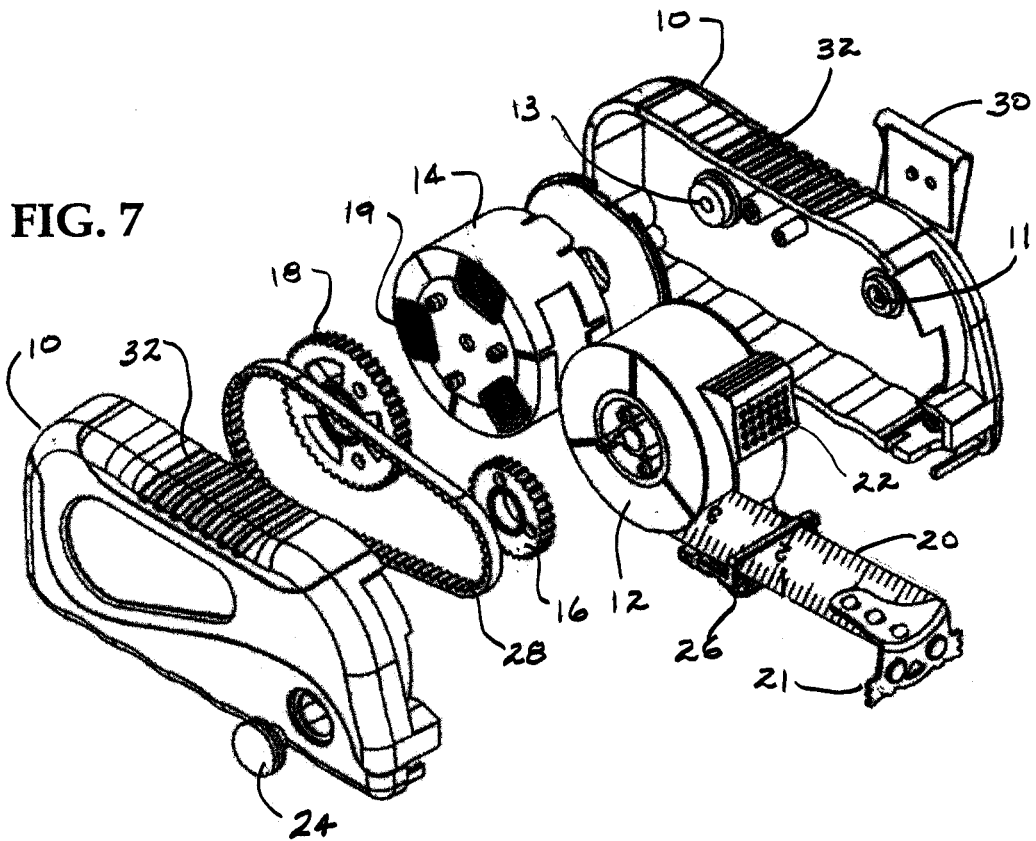
FIG. 7 is an exploded view of the tape measure of the present invention.

In the following description like reference characters designate like parts throughout the several views. The present invention comprises a measuring device having a housing 10 for encasing a self-powered double-axis reel assembly. FIGS. 1, 2 and 3 show the tape measure housing 10 and the soft durable material 32, such as rubber, that may be contoured on the housing 10 to improve grip and comfort. The housing 10 is an oblong shape extended in the longitudinal direction which allows the device to be comfortably held in the user's hand. In the preferred embodiment, the proportional dimensions of the housing 10 approximate 3:1.5:1 (length: width: height). FIGS. 1 and 2 also show the stop 21 at the end of the tape blade 20 to prevent the tape blade 20 from retracting into the tape measure housing 10.

FIGS. 4, 5, 6 and 7 show the inner components of the tape measure. The operating components of the tape measure comprise a double axis design with the first axis 11 having a first gear 16 and a primary spool 12, and the second axis 13 having a second gear 18 and a secondary spool 14. In the preferred embodiment, the first gear 16 and the second gear 18 are wheels with teeth extending from them; however, with respect to this invention, a "gear" is a broad term that includes pulleys and other mechanical wheels that do not have teeth.

The first gear 16 and the second gear 18 are connected by an endless flexible member 28. A length of measuring tape blade 20 is wound onto the primary spool 12 so as to store the tape blade 20 when it is not in use in its extended position. The measuring tape blade 20 can be made of any material such as metal, alloy, plastic, or cloth, with the preferred material being steel. The secondary spool 14 has a self-restoring elastic body wound around it, such as a spring 19.

As best seen in FIGS. 3–7, the first gear 16 and the second gear 18 are connected by an endless flexible member 28, such as a chain, belt, cable, or cord. In the preferred embodiment, the endless flexible member 28 is a belt with teeth on its interior surface. The teeth on the endless flexible member 28 interlock with the teeth of the gears 16, 18. The diameter ratio of the first gear 16 to the second gear 18 is less than 1:1 for increasing mechanical advantage, although the diameter ratio can vary.

When the tape blade 20 on the primary spool 12 is pulled out of the housing 10 by force, the spring 19 on the secondary spool 14 is synchronously contracted because of its connection to the primary spool 12 by the endless flexible member 28. When the external force disappears, the previously contracted spring 19 will produce a restoring force, which enables the previously extended tape blade 20 to recoil automatically. The recoiling force of the spring-driven double axis assembly is smooth, and the fatigue failure of the spring 19 will not occur even under frequent use.

The preferred embodiment of the present invention comprises three independent actuating means for selectively locking the tape measure blade 20 in the extended position. These three independent means are located at different positions on the tape measure housing 10, allowing the user to employ the means that is most comfortable for him/her. The first means is the tape blade lock 22 which is manually movable from a first unlocked position to a second locked position. In the second position, the lower edge 23 of the tape blade lock 22 clamps the tape blade 20 downwardly against a stop 25 (see FIG. 6) so that it cannot be recoiled by the spring 19. The blade lock 22 remains in the second position even when force is removed from it. When the tape blade lock 22 is moved to the first position, the clamping means releases the blade 20, and the spring 19 recoils the extended tape blade 20 onto the primary spool 12.

The second actuating means is the side point break which comprises an actuator button 24 on the side of the tape measure housing 10 which button 24 engages the side of the spool 12 to stop its rotation and therefore hold the tape blade 20 in the extended position when the button 24 is depressed and held. When force is released from the side point break button 24, pressure is released from the spool 12, and the spring on the secondary spool 14 recoils the tape blade 20 into the housing 10. The third blade clamping means is the bottom point break actuator button 26, which is located on the bottom of the tape measure housing 10 instead of on the side of the housing. When sufficient force is applied to the button 26, it will engage the bottom surface of the tape blade 12 and force it against a stop 27 which will hold the blade 12 from retracting as long as force continues to be applied to the button 26.

The second and the third clamping means each allows the user to recoil the tape blade 20 in an "inching mode". Inching mode allows the user to control the speed at which the tape blade 20 recoils into the housing 10 and to stop the recoil at any point, if desired. In either the second or the third clamping means, the user can apply light pressure to the button 24, 26 which allows the tape blade 20 to recoil at a slow rate.

FIG. 3 shows a belt clip 30 attached to the housing 10. The belt clip 30 facilitates the carrying of the tape measure by allowing the user to hook the clip 30 onto the waistline of pants. The belt clip 30 is capable of rotating ninety degrees (90°) so that the user can carry the tape measure either vertically or horizontally, depending on user preference.

In operation, the tape blade 20 is pulled from the housing 10 by gripping the stop 21 with the fingers of one hand while the tape measure housing 10 is held in the other hand. The ergonomic design of the tape measure facilitates taking measurements using only one hand to hold the tape measure housing 10. After the tape blade 20 is pulled from the tape measure housing 10, any of the three the blade stop actuating means 22, 24, or 26 can be actuated by the thumb or fingers to clamp the tape blade 20 at a desired extended position. The tape blade 20 includes indicia of distances along its length corresponding to standard measurement increments. When the lock actuator means 22, 24, or 26 is released, the self-powered, reel assembly 14 retracts the tape blade 20 into the housing 10 until the tape stop 21 comes to rest against the housing 10.

Having thus described the invention in connection with the preferred embodiments thereof, it will be evident to those skilled in the art that various revisions can be made to the preferred embodiments described herein with out departing from the sprit and scope of the invention. It is my intention, however, that all such revisions and modifications that are evident to those skilled in the art will be included with in the scope of the following claims.

The invention claimed is:

1. A tape measure having a double-axis reel assembly comprising:
   a primary axis;
   a primary spool and a first gear turnable together about the primary axis;
   a flexible measuring tape blade wound upon the primary spool and normally in a fully retracted position on the primary spool;
   the secondary axis;
   a secondary spool and a second gear turnable together about the secondary axis;
   the secondary spool having a self-restoring spring wound around it and contained within the spool so as to wind and unwind about the secondary axis as the second gear turns; and
   an endless flexible member connecting the first gear and the second gear, whereby extension of the tape blade from its retracted position causes turning of the primary spool which in turn causes turning of the secondary spool to place the spring of the secondary spool in a spring-wound condition which spring will cause retraction of the tape blade upon release of the tape blade from an extended position.

2. The tape measure of claim 1 further comprising a housing for enclosing said primary spool and first gear, said secondary spool and second gear, and said endless flexible member, the housing having a top, bottom, sides and ends with the measuring tape blade having a portion extending outside one end of the housing, said portion being adapted to be gripped by the user of the tape measure so as to extend the tape blade from its normally retracted position substantially inside the housing.

3. The tape measure of claim 2 wherein the housing is oblong shaped.

4. The tape measure of claim 3 wherein the proportions of the housing are approximately 3: 1.5: 1 in length: width: height.

5. The tape measure of claim 2 further comprising a tape blade lock combined with the housing and having an actuator extending outside the housing for operation by the user to selectively maintain the measuring tape blade at a desired extended position during use.

6. The tape measure of claim 5 in which the actuator of the tape blade lock extends outside one of the sides of the housing and is operable by the user to selectively engage and hold the primary spool thereby maintaining the measuring tape blade at a desired extended position as long as the actuator is held by the user.

7. The tape measure of claim 5 in which the actuator of the tape blade lock extends from the bottom of the housing and is operable by the user to selectively engage and hold the measuring tape blade thereby maintaining the measuring tape blade at a desired extended position as long as the actuator is held by the user.

8. The tape measure of claim 5 in which the actuator of the tape blade lock extends from the same end of the housing as the measuring tape blade and is operable by the user to selectively engage and hold said measuring tape blade so as to maintain said measuring tape blade at a desired extended position during use.

9. The tape measure of claim 8 in which the actuator has a lock that maintains the actuator in a locked position holding the measuring tape blade in an extended position when the actuator is released by the user.

\* \* \* \* \*